(12) United States Patent
Stankowski et al.

(10) Patent No.: US 8,235,275 B1
(45) Date of Patent: Aug. 7, 2012

(54) BRAZE FOIL FOR HIGH-TEMPERATURE BRAZING AND METHODS FOR REPAIRING OR PRODUCING COMPONENTS USING A BRAZE FOIL

(75) Inventors: Alexander Stankowski, Würenlingen (CH); Daniel Beckel, Wettingen (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 13/232,109

(22) Filed: Sep. 14, 2011

(30) Foreign Application Priority Data

Jul. 19, 2011 (CH) ...................................... 1204/11

(51) Int. Cl.
*B23K 31/02* (2006.01)
*B23K 35/14* (2006.01)
*B23P 6/04* (2006.01)

(52) U.S. Cl. .... 228/56.3; 228/119; 228/246; 228/248.1; 29/889.1

(58) Field of Classification Search .................... None
See application file for complete search history.

(56) References Cited

U.S. PATENT DOCUMENTS

| | | | |
|---|---|---|---|
| 4,160,854 A * | 7/1979 | D'Silva | 36/166 |
| 4,169,744 A * | 10/1979 | D'Silva | 148/427 |
| 4,228,214 A * | 10/1980 | Steigelman et al. | 428/212 |
| 4,381,944 A | 5/1983 | Smith, Jr. et al. | |
| 4,448,618 A * | 5/1984 | Bose et al. | 148/403 |
| 4,745,037 A * | 5/1988 | DeCristofaro et al. | 428/678 |
| 4,801,072 A * | 1/1989 | Henschel | 228/245 |
| 5,240,491 A | 8/1993 | Budinger et al. | |
| 5,501,391 A * | 3/1996 | Wieres | 228/248.1 |
| 5,806,751 A | 9/1998 | Schaefer et al. | |
| 5,830,292 A * | 11/1998 | Eiter et al. | 148/528 |
| 6,050,477 A | 4/2000 | Baumann et al. | |
| 6,276,597 B1 | 8/2001 | Budinger et al. | |
| 6,283,356 B1 | 9/2001 | Messelling | |
| 6,464,128 B1 | 10/2002 | Messelling et al. | |
| 7,279,229 B2 | 10/2007 | Budinger et al. | |
| 2003/0062396 A1* | 4/2003 | Kovacich | 228/56.3 |

(Continued)

FOREIGN PATENT DOCUMENTS

DE 102007028275 A * 12/2008

(Continued)

OTHER PUBLICATIONS

Search Report for Swiss Patent App. No. 1204/2011 (Nov. 25, 2011).

(Continued)

*Primary Examiner* — Kiley Stoner
(74) *Attorney, Agent, or Firm* — Cermak Nakajima LLP; Adam J. Cermak

(57) ABSTRACT

An amorphous braze foil (1) produced by a melt-spin process has an upper side and a lower side. The upper side and the lower side are thinly coated with a film of metallic Ni-based, Co-based, or Ni—Co-based braze powder (2) with a particle size in the nanometer range, wherein both the braze foil (1) and also the braze powder (2) additionally include grain boundary stabilizing elements as alloying elements. In addition, melting point depressants can be present in the braze foil or in the nano braze powder (2) in a commercially common quantity or with a considerably increased proportion. With the braze foil (1) coated in this manner, both the melting temperature of the braze material and also the probability of recrystallization are advantageously reduced when brazing in the adjacent base material (10).

14 Claims, 3 Drawing Sheets

U.S. PATENT DOCUMENTS

| | | | |
|---|---|---|---|
| 2004/0050909 A1 | 3/2004 | Renteria et al. | |
| 2004/0050913 A1 | 3/2004 | Philip | |
| 2005/0072830 A1* | 4/2005 | Ditzel et al. | 228/56.3 |
| 2005/0109818 A1 | 5/2005 | Shimohata et al. | |
| 2006/0071056 A1 | 4/2006 | Das | |
| 2006/0163322 A1* | 7/2006 | Mochizuki et al. | 228/101 |
| 2006/0166028 A1* | 7/2006 | Sagawa et al. | 428/619 |
| 2008/0017694 A1 | 1/2008 | Schneil et al. | |
| 2008/0093903 A1* | 4/2008 | Fujioka et al. | 297/301.3 |
| 2008/0187777 A1* | 8/2008 | Sathian | 428/680 |
| 2008/0209726 A1 | 9/2008 | Powers | |
| 2008/0318082 A1* | 12/2008 | Hartmann et al. | 428/681 |
| 2009/0014505 A1 | 1/2009 | Cretegny et al. | |
| 2009/0014694 A1* | 1/2009 | Mukuno et al. | 252/513 |
| 2009/0022636 A1* | 1/2009 | Inaguma et al. | 422/211 |
| 2009/0087340 A1* | 4/2009 | Hartmann et al. | 420/472 |
| 2009/0110955 A1* | 4/2009 | Hartmann et al. | 428/684 |
| 2009/0130483 A1* | 5/2009 | Hartmann et al. | 428/682 |
| 2009/0236725 A1* | 9/2009 | Hirano et al. | 257/690 |
| 2010/0028716 A1* | 2/2010 | Nuetzel et al. | 428/679 |
| 2010/0032472 A1 | 2/2010 | Heinecke et al. | |
| 2010/0136360 A1* | 6/2010 | Mochizuki et al. | 428/553 |
| 2011/0076147 A1 | 3/2011 | Ganesh et al. | |
| 2011/0250470 A1* | 10/2011 | Hartmann et al. | 428/679 |
| 2011/0296766 A1* | 12/2011 | Sung | 51/297 |
| 2012/0006522 A1* | 1/2012 | Hartmann et al. | 165/185 |

FOREIGN PATENT DOCUMENTS

| | | |
|---|---|---|
| EP | 0342506 | 11/1989 |
| EP | 0677355 | 10/1995 |
| EP | 1258545 | 11/2002 |
| EP | 1759806 | 3/2007 |
| EP | 1930116 | 6/2008 |
| EP | 1949988 | 7/2008 |
| EP | 1967313 | 9/2008 |
| EP | 2062672 | 5/2009 |
| JP | 6-200344 | 7/1994 |
| JP | 07-256445 A * | 10/1995 |
| JP | 2004-082218 A * | 3/2004 |
| WO | WO2008/095531 | 8/2008 |
| WO | WO2010/051803 | 5/2010 |

OTHER PUBLICATIONS

Office Action from co-pending U.S. Appl. No. 13/232,120 (Feb. 27, 2012).

* cited by examiner

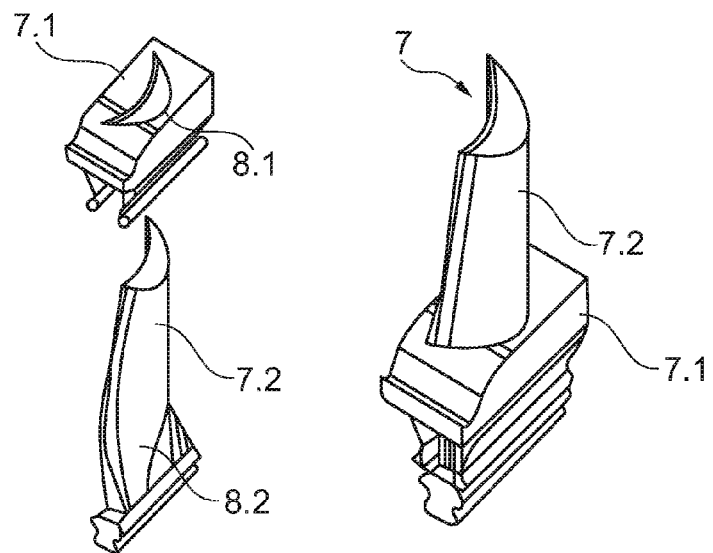
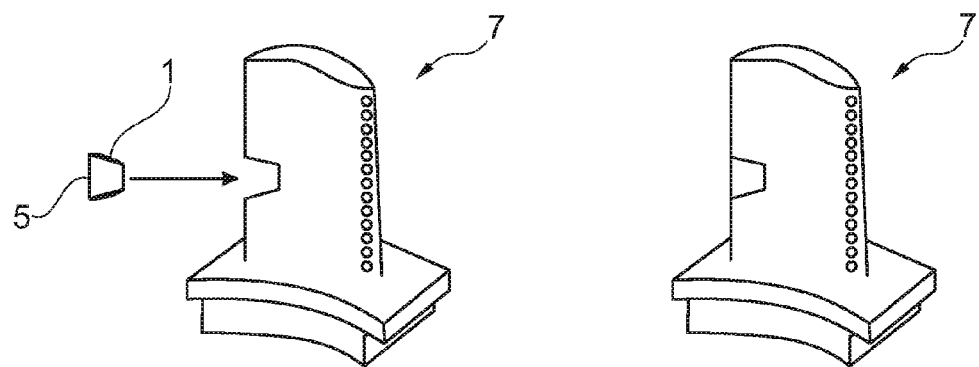
Fig. 5
Fig. 6

BRAZE FOIL FOR HIGH-TEMPERATURE BRAZING AND METHODS FOR REPAIRING OR PRODUCING COMPONENTS USING A BRAZE FOIL

This application claims priority to Swiss application no. 01204/11, filed 19 Jul. 2011, the entirety of which is incorporated by reference herein.

BACKGROUND

1. Field of Endeavor

The invention concerns the field of materials science. It relates to an amorphous braze foil produced by a melt-spin process for high-temperature brazing and to a method for connecting at least two component elements made of single crystal or directionally solidified superalloys for the purpose of producing or repairing components, in particular gas turbine blades or vanes, using a braze foil.

2. Brief Description of the Related Art

At very high loading temperatures, single crystal or directionally solidified components made of superalloys, for example nickel-based, cobalt-based, or nickel-cobalt-based superalloys, have, inter alia, good material strength but also good corrosion resistance and good oxidation resistance as well as good creep strength. On account of this combination of properties, the intake temperature of the turbine can be increased greatly when using such, nevertheless very expensive, materials, e.g., in gas turbines, and therefore the efficiency of the plant increases. Operating temperatures in the hot gas range of above 1400° C. are therefore loading temperatures to which a large number of components of the gas turbine, e.g., guide vanes and rotor blades or combustion chamber liners, are exposed. In addition to these high thermal stresses, turbine rotor blades in particular are also subjected to high mechanical loading, for example. During operation of the turbine, this as a whole can lead to the creation of undesirable cracks in the material, and therefore components damaged in this way either have to be replaced by new parts or else repaired.

Since, as already mentioned above, the production of single crystal or directionally solidified new turbine components is extremely expensive, however, and is complicated in the case of large parts in terms of a sufficient material quality (continuous single crystal or directionally solidified structure), an attempt is usually made to repair the damaged component present, i.e., the functionality of the component should be restored by the repair and the repaired component should then be used again for a further maintenance period in the turbine.

Compared to the repair of damaged components having a conventional polycrystalline microstructure, however, the repair of damaged single crystal or directionally solidified gas turbine components is significantly more difficult, since the repaired regions of the single crystal or directionally solidified components should also have a corresponding single crystal or directionally solidified microstructure; otherwise, the properties are undesirably impaired in the repaired region.

It is known prior art (see, e.g., EP 1 258 545 B1) to repair damaged gas turbine components by using a brazing process, for example. In this case, a braze alloy is applied to the base material in the region of the material damage to the component, e.g., in the region of a crack, and introduced into the crack, and is then melted by the action of heat (the treatment temperature has to be greater than the melting temperature of the braze alloy but less than the melting temperature of the base material) and integrally bonded to the base material. Melting point depressants, in the case of EP 1 258 545 B1, 1-3% by weight B, are usually added to the braze alloy in order to reduce the melting temperature thereof.

Compared to the welding processes for repairing damaged gas turbine components, which are likewise known but not described in more detail here, the brazing process has the advantage that the base material is not melted during the brazing and therefore the single crystal structure of the base material can remain intact.

Diffusion processes occur in the material during the heat treatment in the case of brazing, and these have the effect, among other things, that the melting point depressants, such as boron, diffuse from the braze alloy into the surrounding base material. The braze alloy solidifies as a consequence of the reduction in the boron concentration, whereas the base material has an increased boron concentration in the region surrounding the braze alloy, which can disadvantageously lead to the precipitation of brittle borides.

Furthermore, it is also disadvantageous that the braze material, in contrast to the base material, in many cases cannot have a single crystal or directionally solidified structure after the brazing on account of the major action of heat. This can be attributed, inter alia, to the fact that the high-temperature-resistant superalloys used for gas turbine components also have to be brazed at very high temperatures. Depending on the level of the residual stresses within the region to be repaired, for example a crack, the probability of recrystallization along the surface of the crack is then very high. This applies in particular to the surfaces which are subjected to machining, for example grinding, sandblasting, or shot peening, during the preparation process, before the brazing cycle.

As a result of recrystallization, grains are newly formed in the base material, i.e., firstly a single crystal or directionally solidified structure can no longer be ensured in the base material and secondly the newly formed grain boundaries are not stable. The braze material also solidifies in an unordered polycrystalline structure and therefore disadvantageously has poorer properties than the single crystal or directionally solidified base material.

A polycrystalline structure in the braze material and recrystallization in the base material can only be prevented if the brazing temperature can be kept low enough below a critical value.

It is known from EP 1 759 806 A1 and from U.S. Patent App. Pub. No. 2004/0050913 A1 to reduce the melting point of a braze alloy by reducing the particle size (to values in the nanometer range) of the braze alloy, which is suspended in a carrier liquid, but this is done with the aim of reducing the proportion of melting point depressants, e.g., B and Si, in the braze alloy or of removing these depressants entirely from the braze alloy, since they are disadvantageously responsible for the formation of brittle phases, which, inter alia, cause an undesirable loss of ductility of the material.

The effect achieved by the use of braze powder in the nanometer size range is therefore utilized here for replacing the melting point depressants in the material. The reduction in the melting point of the particles in the nanometer size range is explained by the low activation energy for releasing atoms on the surface of a particle in the nanometer size range as compared to a larger particle. In addition, nanoparticles melt faster than powder particles in the micrometer range, since they have a very large surface-to-volume ratio. This technical solution has the disadvantage that, on account of the sole use of nanoparticles as the solid braze alloy component of the suspension, strong shrinkage occurs after the brazing and therefore the quality of the brazed joint needs to be improved.

As a further possibility for additionally reducing the melting temperature of the nanoparticles when repairing single crystal components made of superalloys by brazing, EP 1 759 806 A1 also indicates that it is possible to add melting point depressants, in particular boron, directly to the braze alloy suspension.

U.S. Patent App. Pub. No. 2004/0050913 A1 additionally discloses a braze material for diffusion brazing, which consists of a powder mixture of filler material particles in the nanometer size range (preferably between 10 and 100 nm) and of powder particles in the micrometer size range (preferably between 45 and 100 µm) in a carrier suspension. As already mentioned above, the nanoparticles melt at a temperature which lies significantly below the melting temperature of particles having a particle size in the micrometer range, and therefore said document again makes express reference to the fact that it is thus advantageously possible for the addition of melting point depressants, such as B or Si, to the braze alloy to be reduced considerably or for the addition of melting point depressants to be dispensed with entirely, and therefore the negative effects which the melting point depressants have on the resulting properties of the brazed joint can be minimized or eliminated completely. By reducing the proportion of melting point depressants, the proportion of additional grain boundary stabilizing elements, such as B, C, Hf, Re, and Zr, in the braze alloy is additionally also reduced.

U.S. Patent App. Pub. No. 2004/0050913 A1 also describes that the surface of the nanoparticles of the braze alloy can optionally be coated with a very thin layer of melting point depressants, such as B or Si, although the overall proportion of melting point depressants in the braze alloy is still significantly lower compared to the proportion according to the known prior art, which is emphasized as being an advantage in that document.

Furthermore, EP 1 930 116 A2 discloses a method for repairing a metallic component having a crack. In this method, first a nanoparticle alloy in the form of a powder, a foil, a suspension, or a paste is introduced into the crack, and a filler alloy which is at least similar to the base material and has a particle size in the micrometer range is applied thereover and then subjected to a conventional diffusion brazing process. The nanoparticles preferably are formed of an Ni-, Co-, or NiCo-based alloy, which preferably additionally includes at least one metal from the group consisting of Ti, Cr, Nb, Hf, Ta, Mo, W, Al, and Fe. By using these materials, it is possible to repair large cracks at relatively low brazing temperatures, this document likewise stating that it is an advantage that the content of melting point depressants can be reduced and the mechanical properties of the metallic component are thereby retained. This technical solution has the disadvantage that, on account of the sole use of nanoparticles in the crack, strong shrinkage occurs after the brazing and therefore the quality of the brazed joint would appear to need improvement.

Finally, EP 1 967 313 A1 describes a braze alloy for repairing turbine components which likewise includes two powder components, wherein the first component is a powder having particle sizes in the micrometer range (0.7-100 µm) and the second component is a powder having particle sizes in the nanometer range (less than or equal to 500 nm). According to an embodiment variant, the first component of the braze alloy, i.e., the powder having a particle size in the micrometer range, which is preferably an alloy, comprises a melting point depressant, to be precise in particular only one melting point depressant from the following group: C, B, Hf, Si, Zr, Ti, and Ta. That document provides no information relating to the quantitative proportion of the melting point depressant in the composition of the first powder. The braze alloy can be applied to or into the damaged site in the form of a paste, a slurry, in pure powder form, or by a foil. The difference between the melting temperature of the braze alloy and the melting temperature of the base material should be as high as possible, at least 70° C.

WO2008/095531 A1 describes a braze alloy composition and a brazing method for superalloys. The braze alloy composition does not include any melting point depressants, but instead is formed of a base material, preferably nickel (or else MCrAlX), and at least one initial phase, preferably aluminum. A twofold heat treatment is carried out, with the first heat treatment being carried out at a temperature at which the initial phase (relatively small Al particles) melts but the base material (Ni) still does not. The initial phase then completely surrounds the relatively large Ni particles. The second heat treatment is then carried out above a temperature at which at least one resulting phase, here nickel aluminide, forms, the solidus temperature of which is higher than the solidus temperature of the initial phase. If the resulting phase after the second heat treatment has mechanical properties which approximate the mechanical properties of the base material, it is possible to bring about reliable joining, e.g., closure of a crack. Here, it is therefore possible to use only strictly limited specific braze alloy compositions which additionally depend greatly on the Al content.

Also known are commercially available, so-called nano-foils having an overall thickness of 40-150 µm, which are produced by the vapor deposition of a multiplicity of separate, alternating layers of Al and Ni (each in the nanometer size range). Such a nano-foil is arranged between two components to be connected, wherein a layer of braze material is present in each case between the surfaces of the nano-foil and the component surfaces and can be applied, for example, to the component surfaces. First of all, a specific pressure is applied in order to prevent slipping of the components, and then a chemical reaction is started between the Al and Ni layers in the nano-foil (activation of the foil) by a small, direct, local energy pulse from electrical, optical or thermal sources. The foil itself then serves as a heat source since, on account of the chemical reaction, the foil supplies heat up to temperatures of 1500° C. locally within fractions of a second, which leads to the melting of the adjacent braze alloy layers, such that the components to be connected are then joined together integrally. Temperature-sensitive or small components can thereby be connected to one another without suffering heat damage, and therefore the foils are used predominantly in the field of microelectronics/optoelectronics. They can also be used readily for connecting metals to ceramic.

SUMMARY

One of numerous aspects of the present invention is based on a braze foil for high-temperature brazing which is improved with respect to an amorphous braze foil known from the prior art and produced by a melt-spin process. Another aspect includes a method for connecting at least two component elements made of single crystal or directionally solidified superalloys for the purpose of producing or repairing components, in particular gas turbine blades or vanes, using a braze foil. The integral metallic joint should in this case be made at relatively low brazing temperatures, recrystallization should be reliably prevented, the flowability of the braze material should be high and even large spacings between the surfaces to be brazed should in particular be able to be bridged efficiently.

Another aspect includes, in the case of an amorphous Ni-based, Co-based, or Ni—Co-based braze foil for high-temperature brazing produced by a known melt-spin process, that the upper side and the lower side of the braze foil are thinly coated with a film of metallic Ni-based, Co-based, or Ni—Co-based braze powder with a particle size in the nanometer range, wherein both the braze foil produced by a melt-spin process and the braze powder additionally comprise grain boundary stabilizing elements, preferably B, C, Hf, Re, or Zr, as alloying elements.

With a braze foil as described herein, it is advantageous that, on account of the nanometer size of the particles on the surface, the melting temperature of the braze material is greatly reduced and as a result the probability of recrystallization in the adjoining base material is simultaneously reduced, and therefore the braze foil can be used outstandingly for brazing single crystal or directionally solidified components. If, however, local recrystallization cannot be avoided in the base material during the brazing, the grain boundary stabilizing elements which are present mean that the grain boundaries are stabilized very effectively. The flow behavior of the braze material is very good. This ensures that uneven gaps to be brazed are filled optimally with the braze alloy, for example.

Another aspect relates to a method for producing or for repairing a component, in particular a gas turbine blade or vane, which includes at least two component elements made of single crystal or directionally solidified nickel-based, cobalt-based, or nickel-cobalt-based superalloys, and the component elements have surfaces which lie face to face and are to be connected, in which a braze foil (without filler particles on the surface) is used, which, after conventional, preceding mechanical preparation of the surfaces to be connected, is applied to at least one of the surfaces, then the surfaces of the component elements which are to be connected are joined to one another with an exact fit to form a joint and pressed together to capillary gap width, and then the braze alloy is melted by simple heat treatment, i.e., without intermediate cooling to room temperature (RT), and cooled to RT, such as to establish an integral bond between the braze material and the surfaces of the component elements, wherein the solidified braze material in the joint has the same single crystal or directional microstructure as the surrounding base material.

A replacement piece made of a single crystal or directionally solidified superalloy can likewise be joined to a damaged component made of a single crystal or directionally solidified superalloy.

The simple brazing process (heat treatment without intermediate cooling to room temperature) and also the relatively low brazing temperature on account of the low melting temperature of the nano braze powder or of the braze foil are advantageous. There is only a small risk of recrystallization.

With the braze foil according to the invention, it is also possible to realize high-quality integral bonds of single crystal or directionally solidified articles/components having surfaces to be connected which are spaced apart by relatively large distances. This is achieved primarily when filler particles are additionally present in the coating of the braze foil, i.e., when a powder mixture of nanoparticles and filler particles is present on the surface of the foil.

Multiple applications of braze alloy with corresponding multiple heat treatments are advantageously not required. The invention makes it possible to extend repairs of blades or vanes of thermal turbomachines to regions of greater loading with a minimal risk of recrystallization.

Here, too, it is of particular interest that only a simple brazing process is required and that the brazing temperature is relatively low on account of the low melting temperature of the braze material. There is only a small risk of recrystallization.

If large filler particles and/or higher proportions of the filler particles are used in the braze coating, larger spacings between the component elements can also be easily brazed, although this takes place without the formation of an epitaxial microstructure.

It is furthermore advantageous if the braze foil and/or the nano braze powder comprises at least one melting point depressant, in a content which is at least as high as in common, commercially available braze alloy compositions.

An increased content of melting point depressants (up to twice as high as in common, commercially available braze alloy compositions, for example about 3 to 7% by weight B, up to 15% by weight Si, and up to 15% by weight P) is particularly advantageous here, because then the known effect of the relatively small particle size of the powder particles on the reduction in the melting temperature and the action of the melting point depressants are strengthened.

In one embodiment variant, the braze foil can additionally comprise, on its surface, filler particles having a particle size in the range of 1-30 μm and a proportion in the overall powder mixture of 1 to 40% by weight. It is preferable for the particle size of the filler particles to be in the range of 1 to 15 μm and for the proportion of the filler particles in the overall mixture to be 5 to 20% by weight. It is then particularly advantageously possible to braze relatively wide gaps, and thus to bridge relatively large spacings between the parts to be connected. In addition, it is possible, depending on the type and proportion of the filler material used, to influence the properties of the brazed region. However, the solidified braze material then does not necessarily have the same single crystal or directionally solidified microstructure as the surrounding base material.

In one embodiment, it is also possible for the surface of the filler particles to be thinly coated with particles of the braze powder. The coating of the upper and lower side of the braze foil and the coating of the filler particles with the particles of the braze powder are particularly advantageous if the coating comprises only one layer up to a maximum of 10 layers of the particles of the braze powder.

BRIEF DESCRIPTION OF THE DRAWINGS

The drawing shows an exemplary embodiment of the invention. Schematically:

FIG. 5 shows a turbine blade or vane of modular structure according to an exemplary embodiment of the present invention, and FIG. 6 shows a turbine blade or vane with a brazed insert according to an exemplary embodiment of the present invention.

DETAILED DESCRIPTION OF EXEMPLARY EMBODIMENTS

In the text which follows, the invention is explained in more detail on the basis of exemplary embodiments and the drawings.

Figure 1:
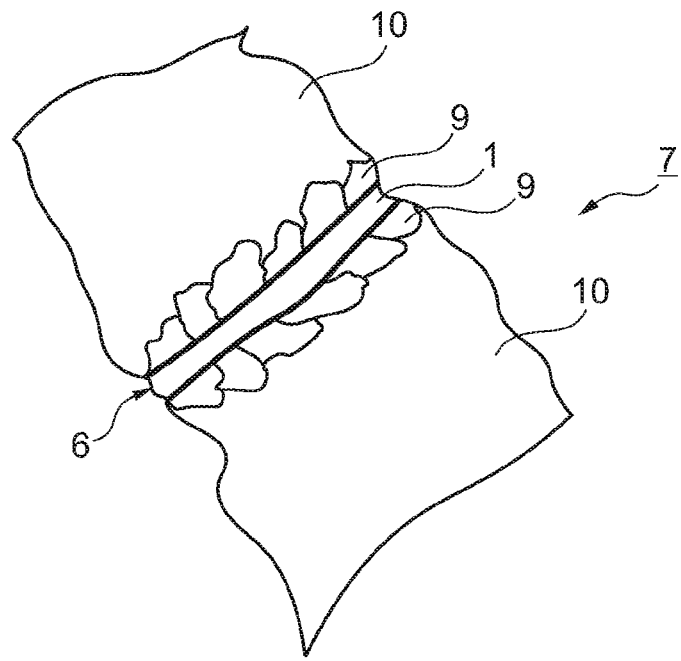
FIG. 1 shows a damaged region of a turbine blade or vane after a repair according to the prior art.

FIG. 1 schematically shows a joint 6 for repairing a damaged component 7 after a conventional brazing repair method according to the prior art. In the present case, the component 7 is a gas turbine blade or vane made of a single crystal base material 10, to be precise CMSX4 (10% by weight Co, 6.5% by weight Cr, 6.5% by weight Ta, 6% by weight W, 5.6% by weight Al, 2.9% by weight Re, 1% by weight Ti, 0.6% by weight Mo, 0.1% by weight Hf, remainder Ni). The joint 6 was repaired using a conventional braze foil 1, which was produced with the aid of a conventional melt-spin process known from the prior art. The chemical composition of the braze material was the following: 15% by weight Cr, 7.25% by weight Si, 1.4% by weight B, ≦0.06% by weight C, remainder Ni. FIG. 1 clearly shows the recrystallization region 9 around the gap to be brazed 6, where there is no longer a single crystal microstructure in the base material 10, i.e., here the properties of the base material 10 differ considerably from the high requirements.

Figure 2:
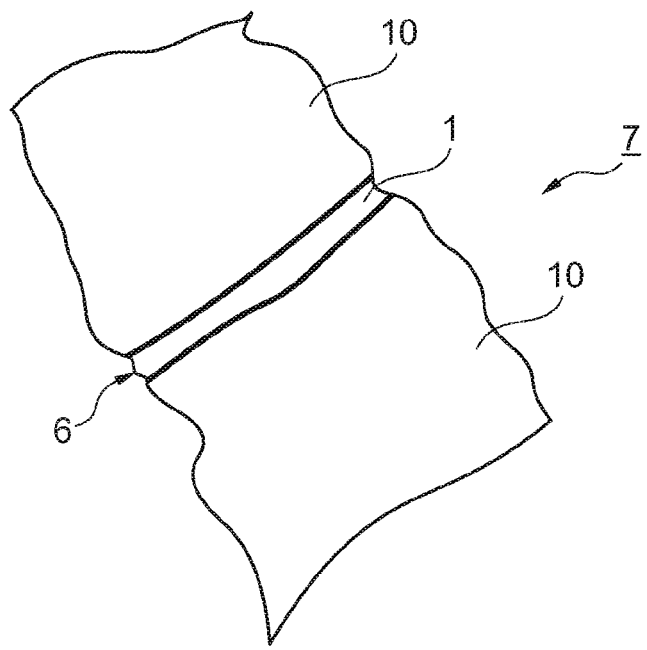
FIG. 2 shows a damaged region of a turbine blade or vane after a repair according to an exemplary embodiment of the present invention.

FIG. 2 schematically shows the joint 6 of the component 7 after a brazing repair method in accordance with principles of the present invention with a braze foil. As compared with FIG. 1, it can clearly be seen that the recrystallized region around the joint 6 is absent in the base material 10, i.e., the base material 10 also has a single crystal structure after the repair, i.e., after the joint 6 has been brazed. The reason for this is explained in connection with FIG. 3.

Figure 3:
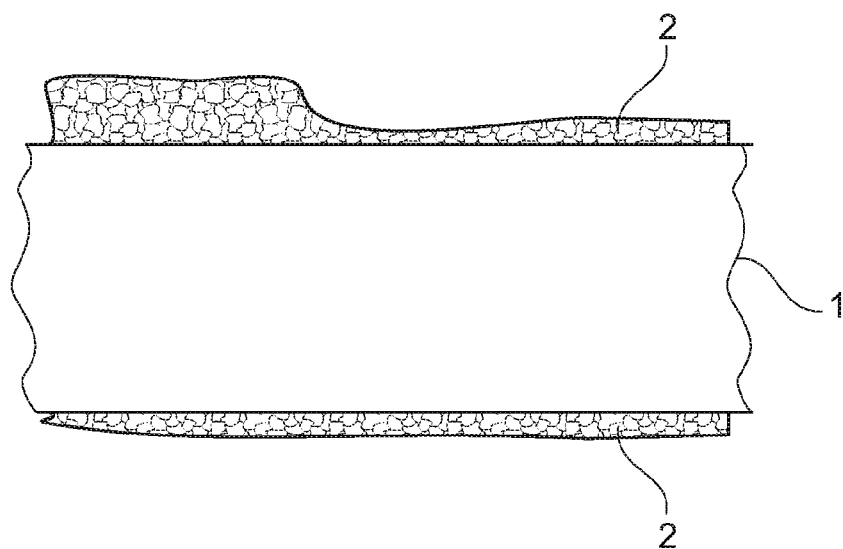
FIG. 3 shows a braze foil according to the invention in a first embodiment variant.

FIG. 3 schematically shows a braze foil 1 according to principles of the present invention in a first embodiment variant. The braze foil 1 was initially likewise produced by the melt-spin process, has an Ni-based, Co-based, or Ni—Co-based chemical composition and is suitable for high-temperature brazing. The braze foil 1 is distinguished by the fact that the upper side and the lower side of the braze foil 1 are thinly coated with a film of metallic Ni-based, Co-based, or Ni—Co-based braze powder 2 with a particle size in the nanometer range (1-999 nm), and that both the (original) braze foil 1 and also the braze powder 2 additionally include grain boundary stabilizing elements, for example B, C, Hf, Re, and/or Zr, as alloying elements. Within the context of the present invention, here metallic is comparable to alloy (Ni-based, Co-based, or Ni—Co-based). The coating of the braze foil can be applied in the form of powder, as a paste, or as a suspension.

Specifically, in this exemplary embodiment the braze foil 1 produced by a melt-spin process had the following material composition: 15.2% by weight Cr, 4% by weight B, 0.06% by weight C, remainder Ni.

The metallic braze powder 2 had the following composition: 15% by weight Cr, 10% by weight Co, 5.5% by weight Al, 3% by weight Ta, 3% by weight B, 0.15% by weight Y, remainder Ni. The powder 2 had a particle size range of 20-50 nm and was applied to the upper side and lower side of the foil in about five layers as a thin film, as indicated at the top on the left-hand side of FIG. 3.

With the braze foil 1, it is advantageous that, on account of the nanometer size of the particles on the surface, the melting temperature is greatly reduced and as a result the probability of recrystallization is simultaneously reduced, and therefore the braze foil can be used outstandingly for brazing single crystal or directionally solidified components. If, however, local recrystallization cannot be avoided in the base material 10 during the brazing, the grain boundary stabilizing elements which are present mean that the grain boundaries are stabilized very effectively. The flow behavior of a braze foil 1 is very good, and as a result even uneven gaps to be brazed 6, as shown for example in FIG. 1, are filled optimally with the braze alloy.

It goes without saying that a braze foil 1 according to principles of the present invention can also be used for the high-temperature brazing of conventionally cast components.

At least one melting point depressant can additionally be present in the braze foil 1 and/or in the nano-powder 2 as alloying element, in a content which is at least as high as in common, commercially available braze alloy compositions, preferably up to about twice as high. By way of example, the proportion can be about 3 to 7% by weight B, up to 15% by weight Si, and up to 15% by weight P.

The effect of the relatively small particle sizes of the powder particles 2 on the reduction in the melting temperature and the action of the melting point depressants are then advantageously strengthened.

Figure 4:
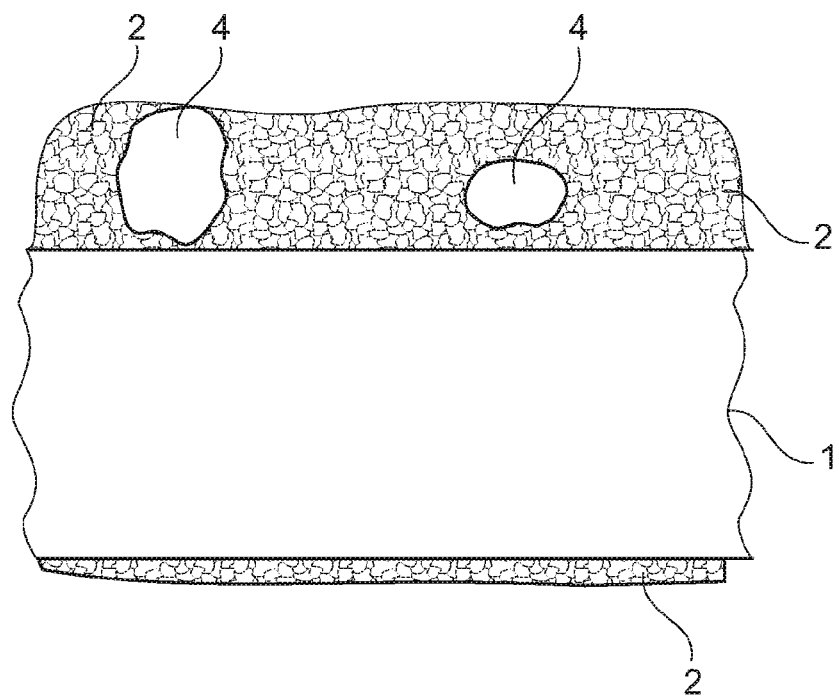
FIG. 4 shows a braze foil according to the invention in a second embodiment variant.

FIG. 4 schematically shows a braze foil 1 according to principles of the present invention in a further embodiment variant. As compared to the variant shown in FIG. 3, here filler particles 4, which are formed of the base material 10 or of derivatives of the base material, are additionally present in the coating of the braze foil 1, i.e., the nano-powder 2 is mixed with the filler particles 4. The filler particles 4 preferably have a particle size in the range of 1-30 μm and a proportion in the overall powder mixture of 1 to 40% by weight. It is advantageous for the particle size of the filler particles 4 to be in the range of 1 to 15 μm and for the proportion of the filler particles 4 in the powder mixture to be 5 to 20% by weight. It is thereby possible to braze particularly relatively wide gaps to be brazed 6, and in addition it is possible, depending on the type and proportion of the filler material used, to influence the properties of the brazed region. However, on account of the large filler particles 4 which are present, it is therefore then to be expected that the braze material no longer solidifies in single crystal form or directionally like the surrounding base material.

It is also possible for the surface of the filler particles 4 to be additionally thinly coated with particles of the nano-powder 2 (see FIG. 4, on the left at the top). The coating of the upper and lower side of the foil 1 and the coating of the filler particles 4 with the particles of the first powder component 2 are particularly advantageous if they include only one layer up to a maximum 10 layers of the particles, because they then partially melt very easily.

If, by way of example, in a preferred exemplary embodiment a gas turbine blade or vane (component 7) made of a single crystal Ni-based superalloy has to be repaired as a result of damage which has arisen during operation, the damaged component 7 is repaired by using a braze foil 1 embodying principles of the present invention (without filler particles 4). After a preceding, conventional cleaning of the joint 6, the braze foil 1 is applied thereto, is then melted by simple heat treatment (i.e., without intermediate cooling to RT), which proceeds in a plurality of stages, and finally cooled to RT, such as to establish an integral bond between the braze material and the surrounding base material 10 of the component 7, wherein the solidified braze material has the same single crystal or directional microstructure as the surrounding base material 10. The heat treatment used here (in a vacuum furnace) should be mentioned by way of example for the concept on which the invention is based: the heating rate was 10-15° C./min, and at 400° C. the temperature was kept constant for 30 min in order to burn out the volatile components of the braze alloy paste on the surface of the braze foil 1. In order to ensure a uniform temperature distribution in the furnace, the temperature was kept constant for 30 min at 930° C. The actual brazing operation was carried out at 1050° C. over the course of 20 min. The temperature was then reduced slowly (1-3° C./min) to 1000° C. and kept constant for 10 hours, in order to make directional or single crystal solidification possible. The temperature was subsequently cooled to room temperature rapidly (about 30° C./min).

The simple brazing process and also the relatively low brazing temperature on account of the low melting temperature of the braze material are advantageous. There is only a small risk of recrystallization in the base material 10, and possible grain boundaries are stabilized, if grain boundaries should in fact form.

If wide gaps (e.g. a gap width of 250 µm) are brazed, there is scarcely any shrinkage if filler particles 4 are present in the coating of the braze foil 1. However, the solidified braze material then does not necessarily have the same single crystal or directionally solidified microstructure as the surrounding base material, but instead it will preferably solidify in polycrystalline form.

It is advantageous that multiple applications of braze alloy with corresponding multiple heat treatments are not required with a method as described herein.

The methods described herein make it possible to extend repairs of blades or vanes of thermal turbomachines to regions of greater loading with a minimal risk of recrystallization and with grain boundaries which possibly arise being stabilized.

Owing to the presence of the braze powder 2 in the nanometer particle size range on the upper and lower side of the braze foil 1 and the melting point depressants, a metallic bond is achieved at relatively low temperatures. The diffusion of the melting point depressants from the metallic braze powder particles stops during servicing of the gas turbine. Since the regions in which recrystallization starts are located on the surface of the component and have only small dimensions, the small diffusion path of the grain boundary stabilizing elements during the brazing cycle is sufficient to locally stabilize the grain boundaries, even if the diffusion from the relatively large braze alloy particles has not yet been completed during the heat treatment.

FIG. 5 shows a new turbine blade or vane of modular structure embodying principles of the present invention as a further exemplary embodiment. The finished turbine blade or vane can be seen in the partial image on the right-hand side of FIG. 5. Since it is difficult and expensive to produce large single crystal components 7, there is also a need for new methods for producing components 7 of modular structure, in particular gas turbine blades or vanes, which are formed of at least two component elements 7.1, 7.2 made of single crystal or directionally solidified nickel-based, cobalt-based or nickel-cobalt-based superalloys. According to the partial image on the left-hand side of FIG. 5, the component 7.1 is the blade or vane root, in which there is arranged an opening for receiving the component 7.2 (=main blade or vane part with the root portion missing in the component 7.1). The component elements 7.1, 7.2 have surfaces 8.1, 8.2 which lie face-to-face, are to be connected and are to be integrally bonded to one another faultlessly. Here, use is made of a braze foil 1 without filler particles 4, which, after conventional, preceding mechanical preparation of the surfaces 8.1; 8.2 to be connected, is applied to at least one of the surfaces 8.1; 8.2. The component element 7.1 is then pushed onto the component element 7.2 with an exact fit and, if appropriate, the two component elements 7.1, 7.2 are pressed against one another, such that only a maximum capillary gap width of about 120 µm is still present. Simple heat treatment is then carried out, during which the braze material is melted and finally cooled to RT, such as to establish an integral bond between the braze material and the surfaces 8.1, 8.2 of the component elements 7.1, 7.2, wherein the solidified braze material has the same single crystal or directional microstructure as the surrounding base material 10.

A replacement piece 5 made of a single crystal or directionally solidified superalloy can likewise be joined epitaxially to a damaged component 7 made of a single crystal or directionally solidified superalloy (see FIG. 6). After the damaged material has been separated from the component 7 and after conventional, preceding mechanical preparation of the surfaces of the component 7 and of the replacement piece 5 which are to be connected, a braze foil 1 without filler particles 4 is applied to at least one of the surfaces to be connected. In the present exemplary embodiment, these are the surfaces of the replacement piece 5. The replacement piece 5 is then inserted together with the applied braze foil 1 into the component 7, here a gas turbine blade or vane, at that point where the damaged material was previously removed (see the arrow in the partial image on the left-hand side of FIG. 6) and, if appropriate, the replacement piece and the component are pressed against one another, such that only a maximum capillary gap width of about 120 µm is still present. The braze material is then melted by simple multi-stage heat treatment (without intermediate cooling to RT). During subsequent cooling to RT, an integral bond is established between the braze material and the surfaces of the component 7 and of the replacement piece 5, wherein the solidified braze material has the same single crystal or directional microstructure as the surrounding base material 10. The repaired component 7 is shown in the partial image on the right-hand side of FIG. 6.

Here, too, it is particularly advantageous that only a simple brazing process is required and that the brazing temperature is relatively low on account of the low melting temperature of the braze foil. There is only a small risk of recrystallization.

If large filler particles are additionally used in the coating of the braze foil and/or if a high proportion of filler particles is used, large spacings (up to 500 µm) between the component elements can also be easily brazed, although in this case (at spacings above the capillary crack width) epitaxial microstructures are not to be expected. Homogeneous filling of the gaps between the surfaces to be brazed with the braze foil is achieved in conjunction with low brazing temperature, which permits a solid metallurgical connection of the segments to be connected.

The general effect of the invention, such as the reduction in the melting temperature of the braze foil and the reduction in the probability of recrystallization, can also be achieved for other classes of braze alloy based on Ag, Cu, and Al for brazing steels, Cu alloys, and Al alloys.

List of reference numerals

| | |
|---|---|
| 1 | Braze foil |
| 2 | Metallic braze powder (with particle sizes in the nanometer range) |
| 4 | Filler particles |
| 5 | Replacement piece |
| 6 | Gap to be brazed |
| 7 | Component |
| 7.1; 7.2 | Component element |
| 8.1; 8.2 | Surfaces which lie face to face and are to be connected |

| List of reference numerals | |
|---|---|
| 9 | Recrystallization region |
| 10 | Base material |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. An amorphous brazing material comprising:
a Ni-based, Co-based, or Ni—Co-based foil having an upper side and a lower side being coated with a film of metallic Ni-based, Co-based, or Ni—Co-based braze powder with a particle size in a nanometer range, wherein both the foil and the braze powder comprise grain boundary stabilizing elements as alloying element.

2. The braze foil as claimed in claim 1, wherein the grain boundary stabilizing element comprises at least one element selected from the group consisting of B, C, Hf, Re, and Zr.

3. The braze foil as claimed in claim 1, wherein at least one of the foil and the braze powder comprises at least one melting point depressant.

4. The braze foil as claimed in claim 3, wherein the at least one melting point depressant comprises at least one element from the group consisting of B, Si, P, and combinations thereof.

5. The braze foil as claimed in claim 4, wherein:
when said at least one melting point depressant comprises boron, the proportion of boron is about 3 to 7% by weight;
when said at least one melting point depressant comprises Si, the proportion of Si is up to 15% by weight; and
when said at least one melting point depressant comprises P, the proportion of P is up to 15% by weight.

6. The braze foil as claimed in claim 1, wherein said film comprises filler particles having a particle size in the range of 1-30 μm and a proportion in the braze powder of 1 to 40% by weight.

7. The braze foil as claimed in claim 6, wherein the particle size of the filler particles is 1 to 15 μm.

8. The braze foil as claimed in claim 6, wherein the proportion of the filler particles in the braze powder is 5 to 20% by weight.

9. The braze foil as claimed in claim 8, wherein surfaces of the filler particles are coated with particles of the braze powder.

10. The braze foil as claimed in claim 9, wherein the coating of the upper and lower sides of the foil and the coating of the filler particles with particles of the braze powder comprise only at most ten layers of the particles of the braze powder.

11. A method for producing or for repairing a component which is formed of at least two component elements made of single crystal or directionally solidified nickel-based, cobalt-based, or nickel-cobalt-based superalloys as a base material, wherein the component elements have surfaces which lie face to face and are to be connected, the method comprising:
providing a braze foil as claimed in claim 1;
mechanically preparing the surfaces to be connected;
applying the coated braze foil to at least one of the surfaces;
joining together the surfaces of the component elements with an exact fit to form a joint, and pressing the component elements together; and
melting the braze material including heat treating, and cooling the braze material to room temperature, said melting and cooling being performed to form a solidified braze material and establish an integral bond between the braze material and the surfaces of the component elements, wherein the solidified braze material in the joint has the same single crystal or directionally solidified microstructure as the surrounding base material.

12. A method as claimed in claim 11, wherein the component is a gas turbine blade or vane.

13. A method for repairing a component which is formed of a single crystal or directionally solidified nickel-based, cobalt-based, or nickel-cobalt-based superalloy as a base material, with a replacement piece in the component to be repaired, wherein the replacement piece consists of a single crystal or directionally solidified nickel-based, cobalt-based, or nickel-cobalt-based superalloy as a base material, the method comprising:
providing a braze foil as claimed in claim 1;
mechanically preparing surfaces of the component and of the replacement piece which are to be connected;
applying the coated braze foil to at least one of the surfaces to be connected;
introducing the replacement piece into the component to form a joint, and optionally pressed the piece in the component; and
melting the braze material including heat treating, and cooling the melted braze alloy to room temperature to form a solidified braze alloy, such that an integral bond between the braze material and the surfaces of the component and of the replacement piece is established, wherein the solidified braze material in the joint has the same single crystal or directionally solidified microstructure as the surrounding base material.

14. A method as claimed in claim 13, wherein the component is a gas turbine blade or vane.

* * * * *